United States Patent [19]

Madsen et al.

[11] Patent Number: 4,476,686
[45] Date of Patent: Oct. 16, 1984

[54] METHODS AND APPARATUS FOR CHILLING A PRODUCT

[75] Inventors: Scott T. Madsen, Burr Ridge; Ralph E. Johanson, Lombard, both of Ill.

[73] Assignee: The BOC Group, Inc., Montvale, N.J.

[21] Appl. No.: 426,314

[22] Filed: Sep. 29, 1982

[51] Int. Cl.³ .............................................. F25D 3/12
[52] U.S. Cl. ......................................... 62/63; 62/68; 62/381; 366/144; 366/147; 99/485; 99/517
[58] Field of Search .................. 99/323.1, 323.2, 485, 99/516, 517, 334; 366/102, 107, 292, 297, 318, 165, 167, 168, 169, 170, 171, 172, 173, 174, 144, 147; 62/63, 68, 64, 136, 230, 342, 384, 320, 379, 381; 134/102, 109

[56] References Cited

U.S. PATENT DOCUMENTS

| | | | |
|---|---|---|---|
| 2,893,216 | 7/1959 | Seefeldt ................................. | 62/384 |
| 3,264,836 | 8/1966 | Miller et al. ........................... | 62/342 |
| 3,291,076 | 12/1966 | Flanigan et al. ....................... | 62/64 |
| 3,359,748 | 12/1967 | Booth .................................... | 62/342 |
| 3,468,135 | 9/1969 | Doll et al. .............................. | 62/384 |
| 3,807,187 | 4/1974 | Vorel ..................................... | 62/76 |
| 3,897,923 | 8/1975 | Lucy, Jr. et al. ..................... | 366/102 |
| 4,137,723 | 2/1979 | Tyree, Jr. ............................... | 62/384 |
| 4,166,364 | 10/1979 | Ruprecht et al. ..................... | 62/384 |
| 4,314,451 | 2/1982 | Leeds et al. ........................... | 62/384 |

Primary Examiner—Philip R. Coe
Assistant Examiner—Michael Knick
Attorney, Agent, or Firm—David L. Rae; Larry R. Cassett

[57] ABSTRACT

A product such as ground meat is efficiently chilled in a blender device having an open top. Liquid carbon dioxide is introduced into the blender at a location below the surface of the product to thereby form solid and gaseous $CO_2$. Mixing elements such as a ribbon screw or the like are operated to pass the product in a countercurrent relation to the carbon dioxide introduced into the blender thereby chilling the product and causing the resulting $CO_2$ gas to rise along one wall of the blender. Deflector means are provided along such wall to direct the rising vapor toward an exhaust plenum located above the open top of the blender.

12 Claims, 1 Drawing Figure

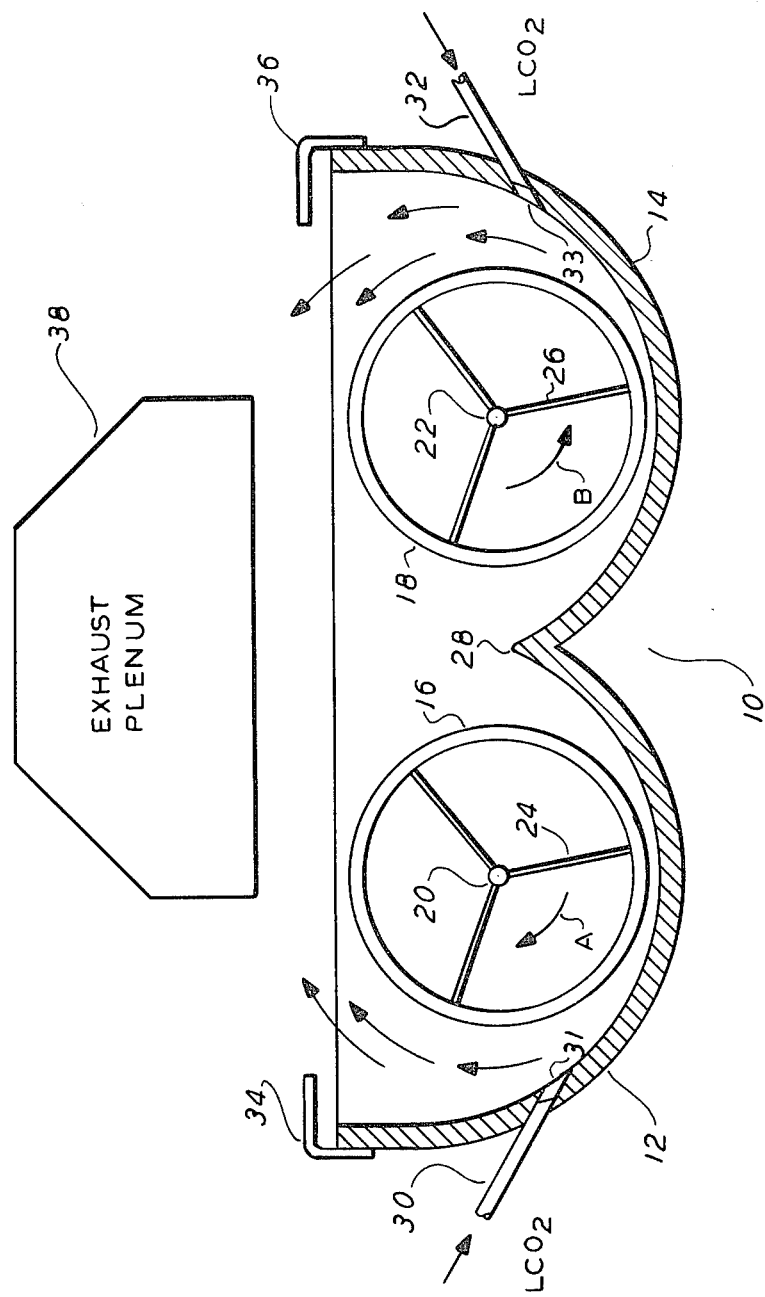

METHODS AND APPARATUS FOR CHILLING A PRODUCT

BACKGROUND OF THE INVENTION

The present invention relates to methods and apparatus for chilling a product and more particularly to methods and apparatus for chilling such product in a blender device with the use of carbon dioxide as a refrigeration medium.

In the course of processing products such as ground meats it is frequently necessary to chill such meat to enable further processing operations to be effected. Large batches of meat products such as ground beef, ground pork, etc. are typically chilled from temperatures of about 40° F. to approximately 28° F. thereby enabling formation of the product in particular shapes such as hamburgers, etc. In order to chill such products, it has been common to utilize blending devices wherein the product to be chilled is mixed with a refrigerant to reduce the average product temperature to a desired level. In the past, blender devices have typically included one or more trough sections in which a mixing element such as a rotatable auger or ribbon screw member is operated so as to pass the products being chilled into contact with the refrigerant thereby reducing product temperature.

Carbon dioxide has been utilized as a refrigerating medium for chilling products in a blending device. Typically, the blender is provided with a cover across the top thereof and means for injecting carbon dioxide through the cover into the interior of the enclosed blender. Those skilled in the art will appreciate that devices known as "snow horns" may be mounted on such a cover and extend therethrough so as to discharge a mixture of solid and gaseous carbon dioxide into the interior of the blender. The cover is typically provided with an exhaust plenum or other means for removing carbon dioxide vapor which is introduced into the blender with solid $CO_2$ and which forms in the blender upon sublimation of the solid carbon dioxide. In operation, the top of the blender is raised and a batch of product to be chilled is introduced into the blender device. The top is then lowered and carbon dioxide is supplied by snow horns as $CO_2$ gas and snow into the blender while the mixing elements are actuated. A suitable exhaust fan in the exhaust plenum system is energized so as to remove $CO_2$ vapor from beneath the blender cover and thereby avoid the buildup of excessive quantities of $CO_2$ gas in the blender. Upon the product reaching a predetermined reduced temperature, the supply of carbon dioxide is terminated and the product is removed from the blender. This may be achieved by terminating operation of the mixing elements and opening the blender top to permit the product to be 'dumped' or opening bottom trap doors. Alternatively, the mixing elements, e.g. screw devices may continue to operate to discharge chilled product through end doors of a blending device of this type. Discharge of the chilled product will enable cleaning of the mixing members and the blender interior. One system for introducing carbon dioxide into a blender through top mounted snow horns is illustrated in U.S. Pat. No. 4,314,451, which is assigned to the assignee of the present invention.

Although the blender devices described above are effective to reduce the temperature of a product, there are several disadvantages attendant to such blending systems. First, it has been found difficult and time consuming to load and unload product into and from a blender as it is necessary to open and close the top cover of the blender. The cover is a relatively heavy member which usually requires hydraulic or pneumatic raising and lowering devices to enable opening and closing thereof. These hydraulic or pneumatic lifting devices are costly and require maintenance to assure effective operation. In addition, the presence of a cover, even in an open position, reduces access to the blender interior and thus renders cleaning of the blender more difficult and time consuming.

The introduction of carbon dioxide through a blender cover as described above is not particularly efficient from a refrigeration viewpoint. It has been found that by expanding liquid carbon dioxide through a nozzle in a snow horn, considerable refrigeration exists in the $CO_2$ gas thus formed. Although this gas will contact the top surface of product being mixed with solid carbon dioxide, relatively little refrigeration available in such $CO_2$ gas is utilized in chilling the product. In addition, solid carbon dioxide which is mixed with the product tends to sublime rapidly and a portion of the solid carbon dioxide introduced into the blender will sublime before being thoroughly mixed with the product. Consequently, a significant portion of the refrigeration available from solid $CO_2$ is not realized in actually reducing temperature of the product being chilled. Thus, blender systems utilizing top mounted snow horns having not been as efficient as desired in terms of utilizing refrigeration available from carbon dioxide.

It has been proposed to introduce carbon dioxide into the lower portions of chilling systems to enable passage of products to be chilled through the carbon dioxide and obtain a greater degree of refrigeration available from the carbon dioxide so introduced. One such system is illustrated in U.S. Pat. No. 3,468,135 wherein a fluidized bed of carbon dioxide is maintained in the lower portion of a chilling device and products are passed through this fluidized bed of $CO_2$. In this system a set of impellers is utilized to impart continuous motion to the bed of carbon dioxide to fluidize the same and cause solid carbon dioxide particles to contact the product being passed therethrough. A cover is required to retain the solid $CO_2$ within the chilling system and although impellers may be effective to fluidize carbon dioxide, such devices tend to impart heat into the portion of the system containing the carbon dioxide refrigerant which in turn is effective to reduce the refrigeration of such carbon dioxide. Consequently, the chilling system described in this reference is not considered to be a particularly effective technique for chilling products and is not considered suitable for chilling products such as ground meat.

Accordingly, there is a clear need for a blending system and method for chilling products which does not require a top cover and associated lifting devices yet which enables efficient use of an expendable refrigerant.

OBJECTS OF THE INVENTION

It is an object of the present invention to provide improved methods and apparatus for chilling products.

It is another object of the present invention to provide improved methods and apparatus for chilling products with the use of carbon dioxide as a refrigerant.

It is a further object of the present invention to provide improved methods and apparatus for chilling products in a blender having an open top yet without incurring excessive consumption of refrigerants.

It is still another object of the present invention to provide improved chilling apparatus which does not require excessive cleaning and maintenance.

It is yet another object of the present invention to provide an open top blender from which rising $CO_2$ vapor is readily collected.

Other objects of the present invention will become apparent from the following description of exemplary embodiments thereof which follows and the novel features will be particularly pointed out in conjunction with the claims appended hereto.

SUMMARY

In accordance with the invention, a product is chilled by directly mixing carbon dioxide and the product in a blender having one or more trough means and an open top, means for injecting liquid carbon dioxide into the trough below the surface of product, mixing means disposed in the trough and adapted to be driven so as to mix the product with solid and gaseous carbon dioxide formed in the trough to thereby chill the product, and deflector means disposed essentially along and above sidewalls of the trough for directing $CO_2$ vapor rising from the open top of the trough means toward an exhaust device. The product to be chilled in the blending apparatus according to the invention is typically a food product such as ground meat and may comprise ground beef, ground pork, ground chicken, etc. Mixing means disposed in the blender trough typically take the form of a rotatable helical ribbon, screw or auger which when driven is effective to mix carbon dioxide introduced into the trough and the product being chilled. The mixing members are driven in a direction countercurrent to the direction in which carbon dioxide is introduced into the trough at a location below the surface of the product. By so introducing carbon dioxide, the weight of the product and the mixing member is effective to dampen the momentum of the introduced solid and gaseous $CO_2$ which in turn permits mixing of carbon dioxide and the product with relatively low turbulence and thus enables $CO_2$ vapor leaving the trough to rise along one wall and to be readily collected by an exhaust plenum above the open top of the blender device.

A plurality of troughs may be utilized with a single blender device and carbon dioxide may be introduced into each trough at a plurality of locations along the length thereof. Preferably, carbon dioxide is introduced at a location below the surface of product in the trough and at a slight angle downwardly from horizontal although $CO_2$ may be introduced into the trough at a slight upward angle or even horizontally. The deflector means provided with the trough in accordance with the invention preferably extend along the length of the trough and over the open top of the trough to the extent necessary to deflect rising $CO_2$ vapor to an exhaust plenum. In effect, the deflector means comprise a lip which overhangs a minor portion of the width of the blender. An exhaust plenum may be located above and at one end of the open top blender device or above and on one side of such device.

BRIEF DESCRIPTION OF THE DRAWING

The invention will be more clearly understood by reference to the following description of exemplary embodiments thereof in conjunction with the following Drawing in which the sole FIGURE is a partial elevational view of the cross section of a blending device according to the invention.

DESCRIPTION OF PREFERRED EMBODIMENT

Referring now to the Drawing, illustrated therein is an exemplary embodiment of a blending device 10 which is provided with two trough sections 12 and 14. A pair of mixing means 16 and 18 which may comprise a rotatable ribbon screw are mounted for rotation about central shafts 20 and 22, respectively. Support members 24 and 26 are provided to securely mount associated mixing means 16 and 18 to the appropriate shafts 20, 22. It will be understood that mixing means 16 and 18 may be comprised of elements such as an auger or rotatable screw member which are effective to mix a solid product such as ground meat with a refrigerant in a manner as will be described below. Liquid carbon dioxide is supplied through conduits 30 and 32 each of which is appropriately connected to nozzles 31 and 33, respectively. Upon discharging liquid $CO_2$ through nozzles 31 and 33, solid and gaseous $CO_2$ will be formed in troughs 12 and 14 of blending device 10. Preferably, liquid $CO_2$ is injected into troughs 12 and 14 in a slight downward direction of approximately 15° from the horizontal although the angle at which such liquid $CO_2$ is supplied to troughs 12 and 14 may be horizontal or even at a slight upward direction. In the latter event, liquid $CO_2$ is directed through the walls of troughs 12 and 14 toward apex 28 between such troughs. Although the product to be chilled is not illustrated in the drawing to thereby enable a better understanding of the invention, the level at which nozzles 31 and 33 are mounted in the walls of troughs 12 and 14 will be such as to assure that liquid $CO_2$ is introduced into these troughs at a location below the upper surface of product therein.

Deflector means 34 and 36 are preferably comprised of elongated members rigidly secured to the upper portion of the side walls of troughs 12 and 14. Deflector means 34 and 36 are preferably configured in the form of lip members which extend over the open top of blending device 10 to a relatively minor degree but to an extent sufficient to cause $CO_2$ vapors rising along the inner surface of trough walls to be directed toward an exhaust plenum 38 which is illustrated as positioned above the open top of blending device 10. It will be understood that plenum 38 may be located at one side or end of blending device 10 or thereabove as depicted in the drawing. The actual geometrical configuration of deflector means 34 and 36 is not critical although members having an L-shaped cross section will generally be adequate to serve the purpose mentioned above. Preferably, deflector means 34 and 36 extend along substantially the complete length of the side walls of trough means 12 and 14. In a typical blending device 10, deflector means 34 and 36 may, for example, extend approximately 3 inches over the width of the open top of the blending device and may be removably mounted on the side walls.

The operation of blending device 10 will now be described. Initially, a charge or batch of product such as ground beef, pork, etc. will be introduced into troughs 12 and 14 to a height above the location at which nozzles 31 and 33 are disposed in the side walls of troughs 12 and 14. Mixing means 16 and 18 are actuated by energization of a drive motor (not shown) which in turn is effective to rotate shafts 20 and 22 thereby rotating mixing means 16 and 18. Liquid carbon dioxide is then introduced through appropriate valves (not shown) through conduits 30 and 32 and is injected into the product within troughs 12 and 14 through nozzles 31 and 33, respectively. Operation of mixing means 16 and 18 will be effective to continuously cause solid and gaseous carbon dioxide formed in troughs 12 and 14 to directly contact the product therein. This contact will result in a chilling of the product as solid carbon dioxide is sublimed and refrigeration of the cold $CO_2$ gas is yielded to the product.

Mixing means 16 is rotated in the direction of arrow A while mixing means 18 is rotated in the direction of arrow B. The rotation of mixing means 16 and 18 will be effective to pass product in troughs 12 and 14 countercurrent to the direction at which liquid carbon dioxide is supplied into each trough. This countercurrent contact between product being chilled and $CO_2$ introduced into each trough is effective to dampen or reduce the momentum of the supplied solid and gaseous carbon dioxide and thereby achieve a relatively low turbulence contact between the $CO_2$ refrigerant and product being chilled. It will be understood that typically liquid carbon dioxide is supplied to each of nozzles 31 and 33 under pressures of approximately 200–300 psig. By introducing the resulting solid and gaseous carbon dioxide at a location considerably below the surface of product in troughs 12 and 14, the weight of such product and the weight of the mixing means 16 and 18 will be sufficient to dampen or reduce the momentum of such $CO_2$. This will avoid lifting of the product out of the blender and will tend to retain such carbon dioxide in contact with the product being chilled rather than simply permitting the resulting $CO_2$ snow and vapor to exit trough means 12 and 14 without yielding a considerable portion of the refrigeration available in such carbon dioxide. The passage of product being chilled countercurrent to the stream of $CO_2$ solid and gas is also effective to maximize contact between the product and this refrigerant thereby enabling a more effective use of $CO_2$ as a refrigerant. Moreover, by passing product being chilled and the solid and gaseous carbon dioxide stream in a countercurrent relationship as described above, it has been found that the majority of $CO_2$ vapor either introduced into troughs 12 and 14 as vapor or resulting from sublimed solid carbon dioxide will rise along the outer walls of troughs 12 and 14 and will be readily directed by deflector means 34 and 36 to exhaust plenum 38. Consequently, a complete cover or top for troughs 12 and 14 is not required as the $CO_2$ vapor rising from the open top of troughs 12 and 14 will be readily directed by deflectors 34 and 36 to exhaust plenum 38. Consequently, by utilizing deflector means 34 and 36 and a stream of solid and gaseous $CO_2$ as mentioned above, the need for a cover over such troughs and associated raising and lowering equipment can be eliminated without impairing the capability of exhaust plenum 38, which as mentioned above, is preferably disposed at one end of troughs 12 and 14, to collect $CO_2$ vapors rising from the open top of the troughs.

In addition to directing $CO_2$ vapors toward exhaust plenum 38, deflector means 34 and 36 are effective to prevent the spillage of product over the side walls of troughs 12 and 14. Furthermore, it has been found that by introducing solid and gaseous $CO_2$ through nozzles 31 and 33 at a location toward the bottom of troughs 12 and 14, the temperature of $CO_2$ vapor reaching exhaust plenum 38 will be considerably higher than is the temperature of vapor exhausted through a typical exhaust plenum provided with a blender employing injection of $CO_2$ through a top or cover. For example, is has been found with the latter type of blending systems that the temperature of such $CO_2$ vapor in an exhaust plenum will be typically about −20° to −30° F. while with apparatus according to the invention, temperatures have been measured in a exhaust plenum on the order of approximately 35° F. The significance of such a temperature differential between $CO_2$ vapor evolved from the operation of apparatus according to the invention and prior art apparatus is that the higher the temperature of the exhausted $CO_2$ vapor, the more refrigeration contained in liquid $CO_2$ supplied to the blending device is actually consumed in chilling product. Thus, the apparatus according to the invention enables more efficient chilling of product in terms of the amount of carbon dioxide required to chill a given amount of product to a particular temperature. In addition, it has been found that virtually no solid $CO_2$ is drawn into exhaust plenum 38 upon operation of blending device 10 in accordance with the invention while with blending devices utilizing top injection of $CO_2$ snow and gas, some solid $CO_2$ or snow is frequently found in the exhaust plenum associated therewith. Consequently, avoidance of the exhaust of solid $CO_2$ particles will, in accordance with the invention, result in the sublimation of such particles in a manner more likely to yield useful refrigeration of the product being chilled.

It will be appreciated that conventional equipment may be utilized to supply liquid $CO_2$ through conduits 30 and 32 and through nozzles 31 and 33 as described above. In addition a vapor purge of such conduits and nozzle may be effected so as to avoid the plugging thereof by the formation of solid $CO_2$. It has been found, however, that such a vapor purge is not necessary when pneumatically operated ball valves (not shown) are utilized in connection with conduits 30 and 32. Furthermore, in order to comply with cleaning requirements, nozzles 31 and 32 may be purged of any product which may adhere thereto by simply permitting the appropriate $CO_2$ supply equipment including conduits 30, 32 and nozzles 31 and 33 to reach ambient temperature such that any liquid $CO_2$ admitted therethrough will vaporize. The resulting vapor pressure will be sufficient to purge nozzles 31 and 33 thereby satisfying cleaning requirements.

The foregoing and other various changes in form and details may be made without departing from the spirit and scope of the present invention. Consequently, it is intended that the appended claims be interpreted as including all such changes and modifications.

We claim:

1. Apparatus for chilling a solid product by mixing said product directly with carbon dioxide comprising:
    trough means having side walls, an open top and a bottom portion;
    means for introducing liquid $CO_2$ into the bottom portion of said trough means at a location below the surface of the product to form solid and gaseous $CO_2$ in the trough means;
    mixing means disposed in said trough means and adapted to be driven so as to pass said product in a direction countercurrent to the direction at which said $CO_2$ is introduced into said trough means and mix said product with said solid and gaseous $CO_2$ whereby said product is chilled;
    means disposed above said open top for exhausting $CO_2$ gas from said trough means; and deflector means disposed substantially along and above said side walls for directing $CO_2$ gas leaving said open top toward said exhaust means.

2. The apparatus defined in claim 1 wherein said side walls of said trough means are substantially curvilinear and said means for introducing liquid $CO_2$ into said bottom portion comprise nozzle means extending through said curvilinear side wall means.

3. The apparatus defined in claim 2 wherein said nozzle means are directed so as to discharge said liquid $CO_2$ at an angle downwardly from horizontal.

4. The apparatus defined in claim 1 wherein said mixer means comprises a rotatable member.

5. The apparatus defined in claim 4 wherein said gaseous $CO_2$ leaving said trough means rises along said side wall in a cocurrent relation with said rotatable member.

6. The apparatus defined in claim 1 wherein said trough means comprise two troughs each having curvilinear bottom walls with one wall of each trough being affixed to one wall of the other trough to define an apex along the length of said connected walls.

7. The apparatus defined in claim 6 wherein said nozzle means comprise a plurality of nozzles extending through the wall of each trough which is not connected to a wall of the other trough.

8. The apparatus defined in claim 7 wherein said nozzles are mounted so as to introduce $CO_2$ solid and gas into said troughs at a downward angle of approximately 15° below horizontal.

9. The apparatus defined in claim 1 wherein said mixing means comprises a rotatable screw ribbon element.

10. The apparatus defined in claim 1 wherein said deflector means comprises a lip extending over a minor portion of the width of said trough means and substantially along the length of said side walls.

11. The method of chilling a product in a blender device comprising the steps of introducing said product into a trough of the blender; introducing liquid $CO_2$ into the product at a location below the surface of the product to form solid and gaseous $CO_2$ in the trough; mixing said product with said $CO_2$ by passing said product countercurrent to the direction in which said $CO_2$ is injected into said trough to chill said product with a major portion of said gaseous $CO_2$ rising substantially along one wall of said trough; and deflecting said major portion of gaseous $CO_2$ as the same rises above the trough toward an exhaust device located above the open top of said trough.

12. The method defined in claim 11 wherein said gaseous $CO_2$ rises along said wall in a substantially cocurrent relation to said product in said trough.

* * * * *